(12) United States Patent
Allie et al.

(10) Patent No.: US 8,503,476 B2
(45) Date of Patent: Aug. 6, 2013

(54) COMMUNICATION METHOD IN A NETWORK COMPRISING A PRIMARY NETWORK AND A SECONDARY NETWORK

(75) Inventors: Valérie Allie, Saint-Armel (FR); Patrick Fontaine, Rennes (FR); Ingrid Autier, Domloup (FR)

(73) Assignee: Thomson Licensing, Issy-les-Moulineaux (FR)

( * ) Notice: Subject to any disclaimer, the term of this patent is extended or adjusted under 35 U.S.C. 154(b) by 0 days.

(21) Appl. No.: 12/316,040

(22) Filed: Dec. 9, 2008

(65) Prior Publication Data

US 2009/0161683 A1 Jun. 25, 2009

(30) Foreign Application Priority Data

Dec. 21, 2007 (FR) ...................... 07 60265

(51) Int. Cl.
*H04J 3/16* (2006.01)
*H04H 20/71* (2008.01)
*H04B 7/212* (2006.01)
*H04W 4/00* (2009.01)
*H04L 12/28* (2006.01)

(52) U.S. Cl.
USPC ........... 370/466; 370/312; 370/322; 370/329; 370/341; 370/401

(58) Field of Classification Search
None
See application file for complete search history.

(56) References Cited

U.S. PATENT DOCUMENTS

| | | | |
|---|---|---|---|
| 6,801,508 B1 | 10/2004 | Lim | |
| 7,082,132 B1 * | 7/2006 | Beshai et al. | 370/391 |
| 2005/0089052 A1 * | 4/2005 | Chen et al. | 370/401 |
| 2006/0052099 A1 | 3/2006 | Parker | |
| 2006/0098614 A1 | 5/2006 | Moon et al. | |
| 2006/0104232 A1 * | 5/2006 | Gidwani | 370/328 |
| 2006/0148483 A1 * | 7/2006 | Howard et al. | 455/450 |
| 2007/0286121 A1 * | 12/2007 | Kolakowski et al. | 370/329 |
| 2009/0086707 A1 * | 4/2009 | Meylan | 370/349 |

FOREIGN PATENT DOCUMENTS

| | | |
|---|---|---|
| CN | 1273473 | 11/2000 |
| CN | 1820465 | 8/2006 |
| FR | 2 872 368 A | 12/2005 |
| JP | 2003259456 | 9/2003 |
| WO | WO2005020517 | 3/2005 |
| WO | WO 2007/113645 A | 10/2007 |

OTHER PUBLICATIONS

Niyatio et al., "A hierarchical model for bandwidth management and admission control in integrated IEEE802.16 802.11 wireless networks", Wireless communications and networking conference, 2007.

(Continued)

*Primary Examiner* — Ayaz Sheikh
*Assistant Examiner* — Sori Aga
(74) *Attorney, Agent, or Firm* — Myers Wolin, LLC (57) ABSTRACT

Communication method between a primary network (110) and a secondary network (24), the secondary network comprising a plurality of remote stations (210 to 230) and having transmission capacities lower than the transmission capacities of the primary network, a base station (20) enabling data transmissions between the primary and secondary networks. In order to guarantee a quality of service, the method comprises:
  a creation of at least one virtual wireless channel (21 to 23), associated with the secondary network with configurable channel parameters, and
  a routing of the data that transits by said base station to be transmitted to the secondary network according to the virtual channel or channels created.
each virtual channel enabling a point-to-point link between the base station and a station of said plurality.

6 Claims, 7 Drawing Sheets

OTHER PUBLICATIONS

Berlemann et al., "Coexistence and interworking of IEEE 802.16 and IEEE802", Vehicular technology conference, 2006. VTC 2006—spring. IEEE63rd, IEEE.

Gakhar et al., "Iroise a new QoS architecture for IEEE 802.16 and IEE802.11e interworking, Broadband networks 2005", Broadband 2005. 2nd international conference on, IEEE.

* cited by examiner

Prior art

COMMUNICATION METHOD IN A NETWORK COMPRISING A PRIMARY NETWORK AND A SECONDARY NETWORK

1. FIELD OF THE INVENTION

This application claims the benefit, under 35 U.S.C. §119, of European Patent Application No. 0760265 filed Dec. 21, 2007.

The present invention relates to the field of wireless telecommunications and more specifically the management of a network comprising a primary network and a secondary network.

2. TECHNOLOGICAL BACKGROUND

According to the prior art, several network architectures are known. They are based on a centralised or non-centralised architecture. Hence, the WiFi system (based on the standard IEEE 802.11a) has a non-centralised architecture with a contention channel access. The WiMax system (based on the standard IEEE 802.16) has a centralised architecture that enables a more suitable quality of service to be implemented for certain applications. A primary network of the wired type can be connected to a wireless network of the WiFi or WiMax type via a dedicated station.

Figure 1:
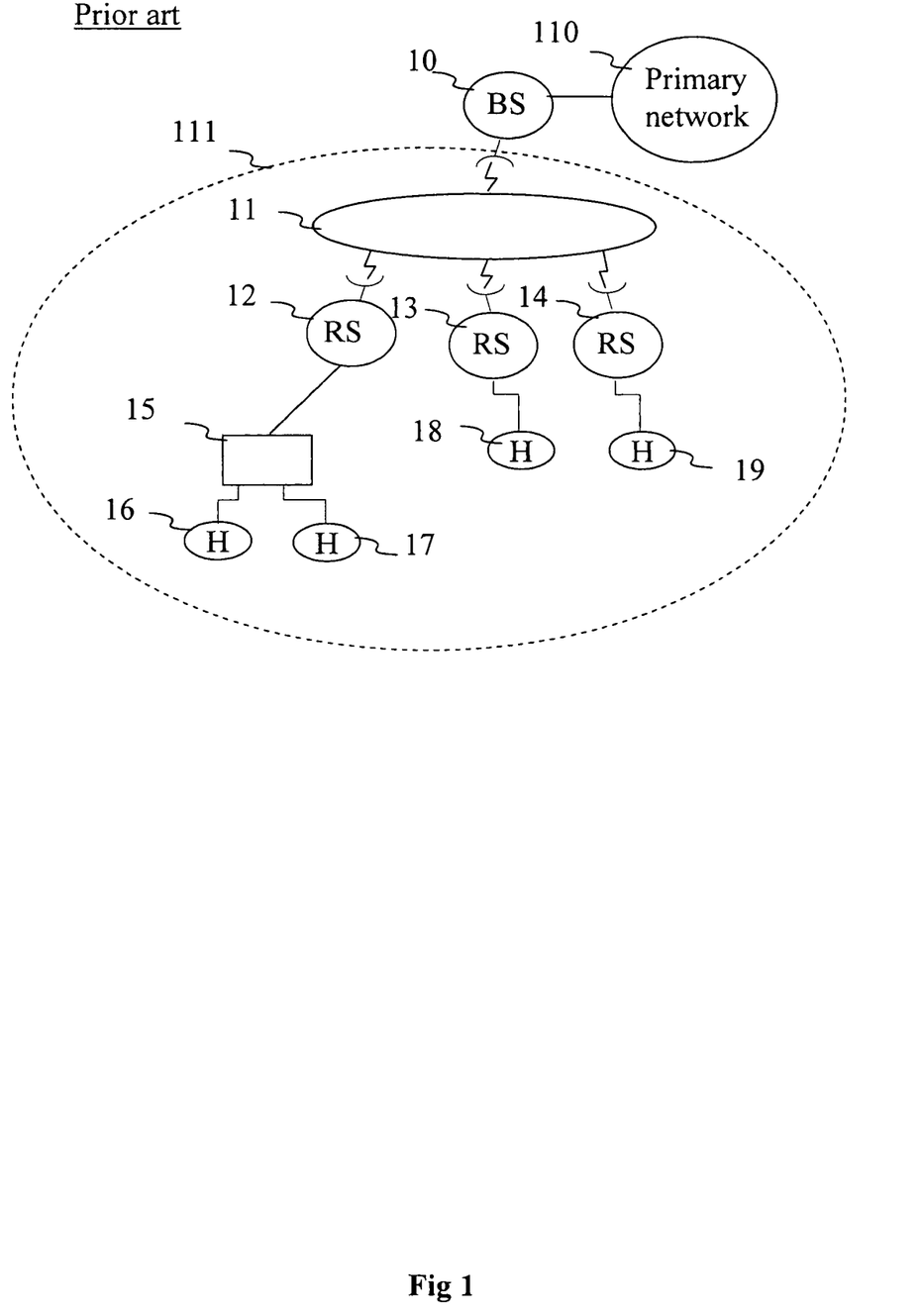
FIG. 1 illustrates an example of communication network architecture, known in itself.

FIG. 1 shows a primary communication network 110 and a secondary communication network 111 connected together by a base station 10.

The network 111 comprises remote stations (RS) 12 to 14 communicating with the base station 10 via a wireless medium (for example radio) 11 for example according to a classic architecture of the WiFi or WiMax type, the medium being shared between all the remote stations. Each remote station is connected to one or more host nodes (H). Hence, to illustrate, the station 12 is connected to two nodes 16 and 17 via a switch 15 via wired links. Likewise, the station 13 (respectively 14) is connected directly to a host 18 (respectively 19) via a wired link.

Within the network 110, the entire bandwidth is shared between the nodes belonging to this network. Likewise, the stations 12 to 14 share the bandwidth offered by the medium 11. Assuming that the bandwidth of the network 110 is greater than the one offered by the medium 11, the quality of service enabling the transmission (respectively the reception) of data of a node of the network 110 toward (respectively from) a node of the network 111 is not guaranteed.

Hence, such architectures based on a medium using the WiFi or WiMax standards do not enable a sufficient quality of service to be managed effectively for certain applications. In other words, the techniques implemented in such networks do not enable a minimum quality of service to be guaranteed for all the applications, for example for communications of the video type transmitted from a primary network to a secondary network whose transmission capacities are not as great as those of the primary network.

3. SUMMARY OF THE INVENTION

The purpose of the invention is to overcome the disadvantages of the prior art.

More particularly, the purpose of the invention is to guarantee a determined quality of service for the transmission and/or reception of data by a station belonging to a secondary network intended for or coming from a primary network, the capacities (particularly in bitrate) of the secondary network being lower than that of the primary network.

The invention relates to a communication method between a primary network and a secondary network, the secondary network comprising a plurality of remote stations and having transmission capacities lower than the transmission capacities of the primary network, a base station enabling data transmissions between the primary and secondary networks. In order to guarantee a quality of service, the method comprises:
   a creation of at least one virtual wireless channel, associated with the secondary network with configurable channel parameters, and
   a routing of the data that transits by said base station to be transmitted to the secondary network according to the virtual channel or channels created.
each virtual channel enabling a point-to-point link between the base station and a station of said plurality.

Hence, each virtual channel is specific to each point-to-point link, the quality of service being guaranteed within each virtual channel.

According to an advantageous characteristic, the method comprises:
   a step for identifying a data recipient node, and
   a step for transmitting data over a virtual channel associated with the recipient node.

According to a particular characteristic, at least one part of the remote stations (namely a part of the remote stations or all the remote stations) is connected to a plurality of client nodes belonging to the secondary network, each client node being suitable to communicate with a node of the primary network via the connected remote station and the base station, the method comprising a step for routing data intended for a client node to a wireless virtual channel associated with a remote station associated with said client node.

Advantageously, the parameters of the channel belong to the group comprising:
   bandwidth characteristics,
   latency characteristics,
   quality of service characteristics, and
   classification criteria.

According to a particular characteristic, the communications on each virtual channel are carried out according to a protocol of the type IEEE 802.16.

According to an advantageous characteristic, the method comprises a step of removing point-to-multipoint links between each remote station of the secondary network and the other stations.

Advantageously, the method comprises a step for verifying the bitrate available for a transmission of a flow on a virtual channel and for authorising transmission of the flow if the available bitrate is sufficient or rejecting transmission of the flow if the available bitrate is insufficient.

According to a particular characteristic, the method comprises a step for transmitting a video flow on at least one virtual channel.

4. LIST OF FIGURES

The invention will be better understood, and other specific features and advantages will emerge upon reading the following description, the description making reference to the annexed drawings wherein.

5. DETAILED DESCRIPTION OF THE INVENTION

Figure 2:
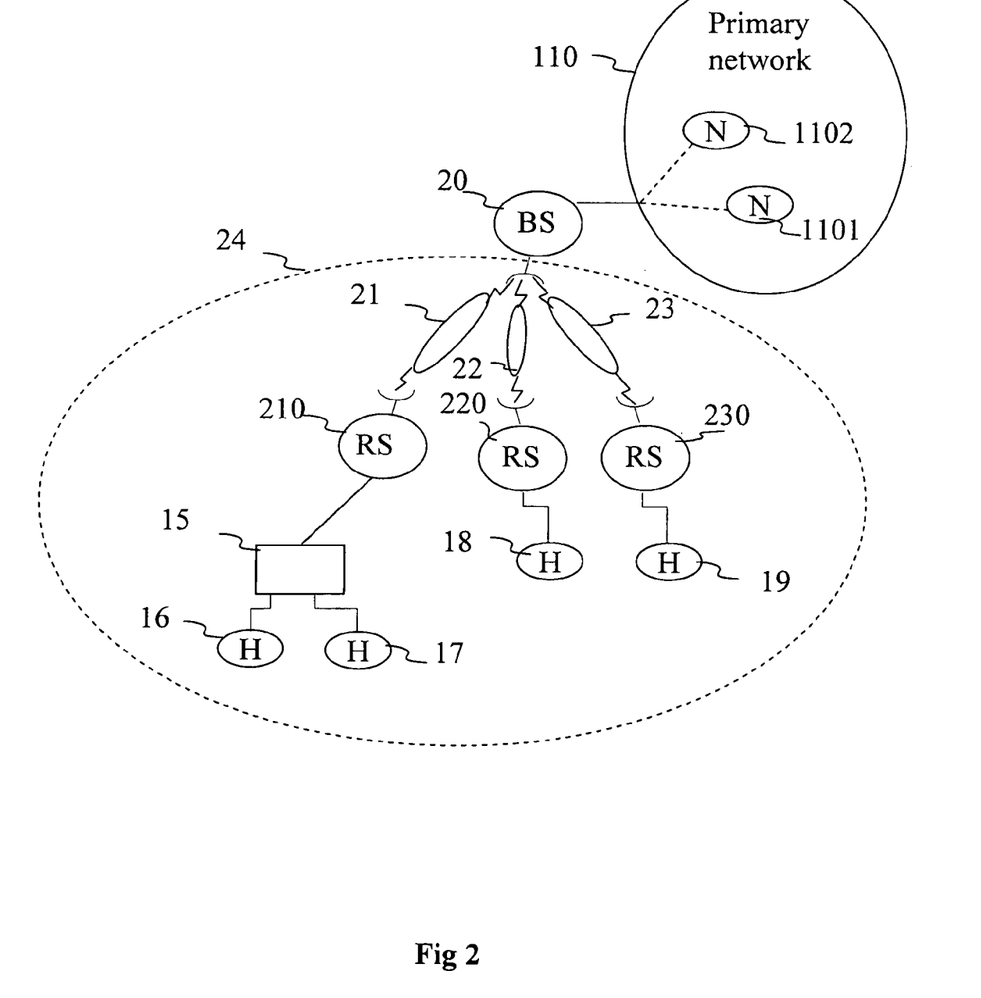
FIG. 2 illustrates an example of communication network architecture with elements implementing the invention, FIGS. 3 and 4 diagrammatically show a base station and a remote station belonging to the network of FIG. 2, according to a particular embodiment of the invention.

FIG. 2 represents a primary communication network 110 and a secondary communication network 24 connected to each other by a base station 20 that controls the access to the network 24 via a wireless medium.

The secondary network 24 comprises remote stations 210, 220 and 230 communicating with the base station 20 via a wireless medium (for example radio) using for example a protocol and an architecture based on the standard IEEE802.16, on the virtual channels respectively 21 to 23. Each remote station is connected to one or more host nodes (H) and/or is itself considered as a host node capable of generating or processing data. Hence, as an illustration, the station 210 is connected to two nodes 16 and 17 via a switch 15 via wired links; the set of the nodes 16 and 17 and the station 210 form an island connected to the base station 20 via the virtual channel 21. Likewise, the station 220 (respectively 230) is connected directly to a host 18 (respectively 19) via a wired link. The hosts 16 to 19 are, for example, computer terminals, cameras equipped with wireless or wired transmitters/receivers suitable to communicate with the base station 20 directly or via a switch.

The primary network 110 comprises one or more nodes (for example the nodes N 1101 and 1102), for example computer terminals, recording studios and television programme broadcast units.

Hence, this architecture is particularly well suited to the emission and/or reception of audio/video data, or even a clock signal using, for example, an IP type Internet protocol. The wired links of the network 24 are, for example, of Ethernet type. The links within the primary network 110 are of any type (for example wire or wireless, short or long distance). The management of the networks 110 and 24 can be carried out in any manner via one or more stations using, for example, an SNMP or IGMP type protocol.

Within the network 110, the entire bandwidth can be shared between the nodes belonging to this network. However, according to the invention, the virtual channels 21 to 23 are specific to a remote station and are not shared. By assuming that the bandwidth of the network 110 is greater than the bandwidth offered by the medium 11 (the medium offers for example a bandwidth of 30 Mbps less than that of the network 110 equal, for example to 100 Mbps), a minimum quality of service enabling the transmission (respectively the reception) of data from a node of the network 110 intended for (respectively coming from) a node of the network 24 can be guaranteed. Hence, the invention is particularly well suited to applications having strong real time transmission constraints (for video, for example) with maximum authorised latencies and/or a maximum authorised jitter. The virtual channels can set up a determined and stable communication link between a source of communication belonging to the secondary network 24 (respectively primary 110) and a destination belonging to the primary network 110 (respectively secondary 24). Hence, if the source is one of the nodes 16 to 19 and the destination a node of the network 110, the data transmission from this source to the destination via the base station 20 and using a virtual channel will not be interrupted or delayed because of congestion on the wireless medium used by the virtual channels, a communication using a virtual channel not using bandwidth reserved by another virtual channel. In this manner, according to a variant implementing the exchange of video data, a video flow is transmitted on at least one virtual channel.

According to the invention, the data intended for a client node connected to a remote station (with respect to the base station) are routed to a wireless virtual channel associated with this remote station.

The communications on each virtual channel are advantageously carried out according to a protocol of the type IEEE 802.16 or, according to a variant, according to a protocol of the type IEEE 802.11.

The bandwidth reservation mechanism on a virtual channel 21 to 23 can be based on any method using, for example, a management protocol such as SNMP, after a discovery phase of the elements of the network 24.

Figure 3:
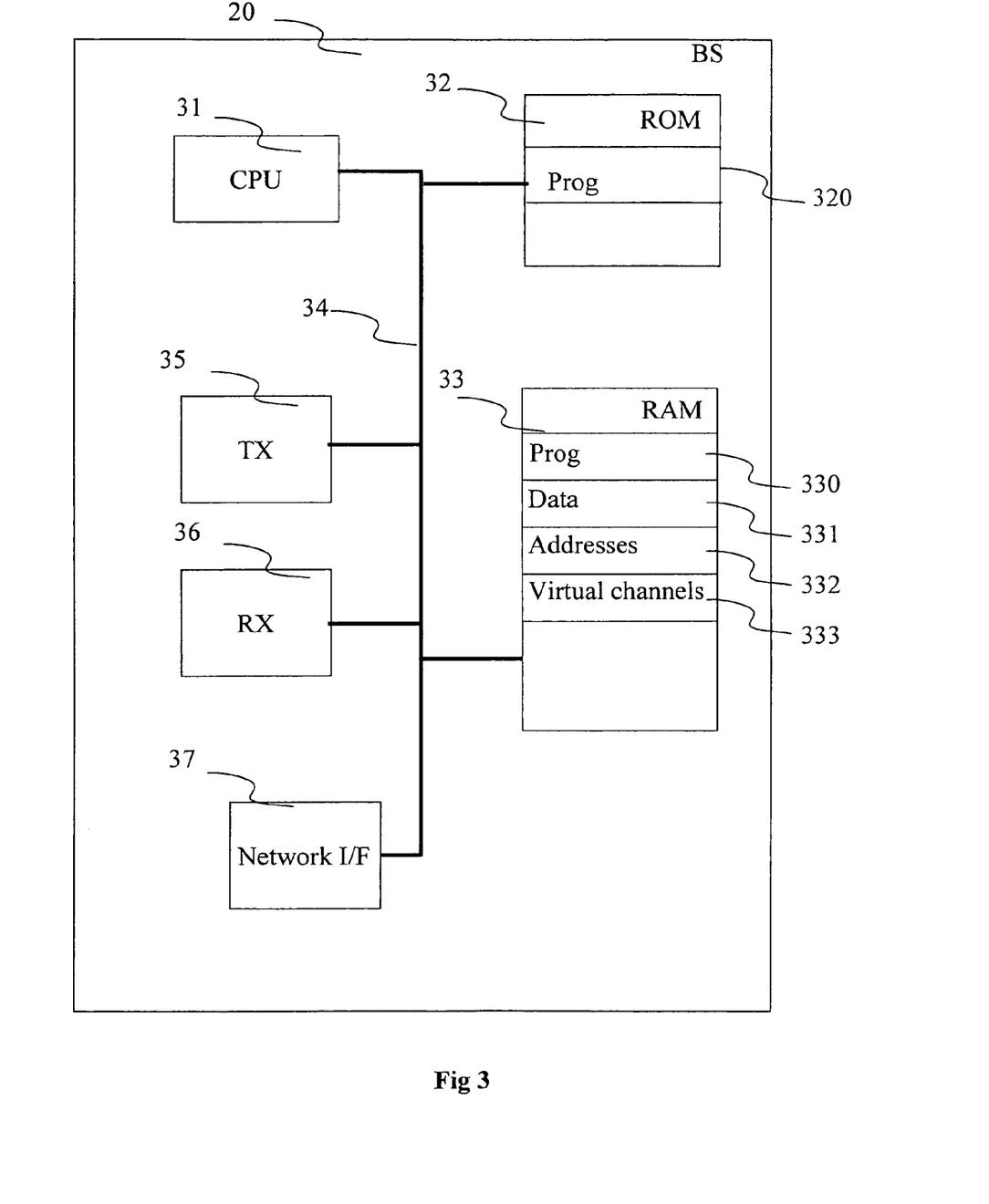

FIG. 3 diagrammatically illustrates the base station 20.

The base station 20 comprises, connected to each other by an address and data bus 34, also carrying a clock signal:
- a microprocessor 31 (or CPU),
- a ROM memory (Read Only Memory) 32,
- a RAM memory (Random Access Memory) 33,
- a module 35 for transmitting a signal over a wireless link (medium 21 to 23) to the remote stations 210, 220 or 230,
- a module 36 for receiving a signal over a wireless link (medium 21 to 23) coming from the remote stations 210, 220 or 230, and
- an interface 37 enabling the communications with the primary network 110.

It is observed that the word "register" used in the description of the memories designates in each of the memories mentioned, a memory zone of low capacity (a few items of binary data) just as easily as a memory zone of high capacity (enabling the storage of a whole programme or all or part of the data representing an audio/video signal).

The ROM memory 32 notably comprises a "prog" programme 320.

The algorithms implementing the steps of the method specific to the invention and described below are stored in the ROM memory 32 associated with the base station 20 implementing these steps. When powering up, the microprocessor 31 loads and executes the instructions of these algorithms.

The RAM 33 particularly comprises:
- in a register 330, the operating programme of the microprocessor 31 responsible for powering up the base station 20,
- data or packets containing this data in a register 331,
- addresses of remote stations in a register 332, and
- parameters of virtual channels in a register 333.

Figure 4:
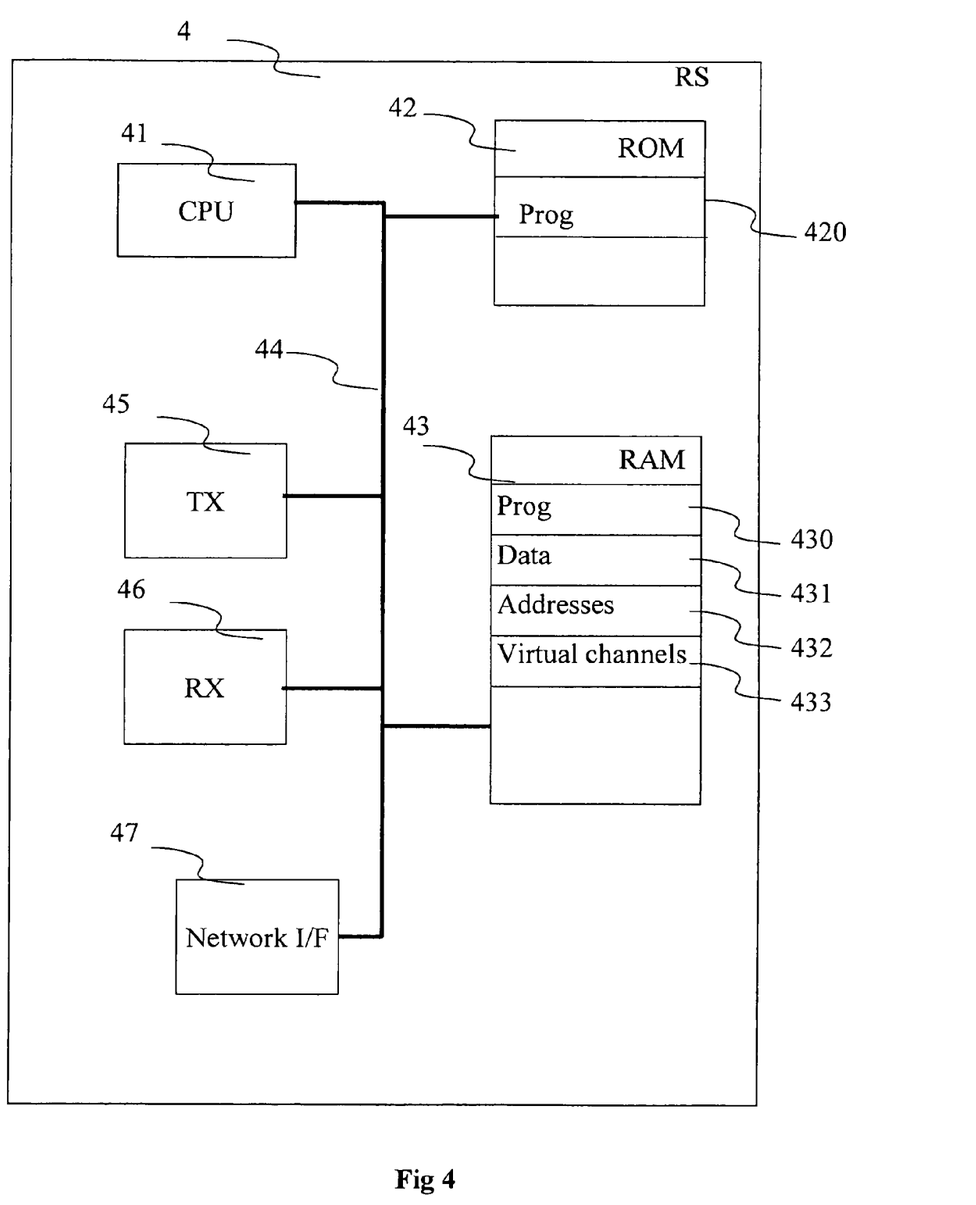

FIG. 4 diagrammatically illustrates a remote station 4 of the network 24 corresponding, for example, to one of the stations 210, 220 or 230.

The remote station 4 comprises, connected to each other by an address and data bus 44, also carrying a clock signal:
- a microprocessor 41 (or CPU),
- a ROM memory (Read Only Memory) 42,
- a RAM memory (Random Access Memory) 43,
- a module 45 for transmitting a signal over a wireless link (medium 21 to 23) to the base station 20,
- a module 46 for receiving a signal over a wireless link (medium 21 to 23) coming from the base station 20, and an interface 47 enabling the communications with one or more nodes of the network 111 (via a medium independent from the medium 21 to 23 used for the communications intended for or coming from the base station 20.

The ROM memory 42 notably comprises a "prog" programme 420.

The algorithms implementing the steps of the method specific to the invention and described below are stored in the ROM memory 42 associated with the remote station 4 implementing these steps. When powering up, the microprocessor 41 loads and executes the instructions of these algorithms.

The RAM 43 particularly comprises:
in a register 430, the operating programme of the microprocessor 41 responsible for powering up the remote station 4,
data or packets containing this data in a register 431,
communication addresses (for example of the base station 20 or host stations connected directly or via a switch to the remote station 4 or of any nodes of the networks 110 or 24 accessible via the base station 20 in a register 432, and
parameters of a virtual channel connecting the remote station 4 to the base station 20 in a register 433.

Figure 5:
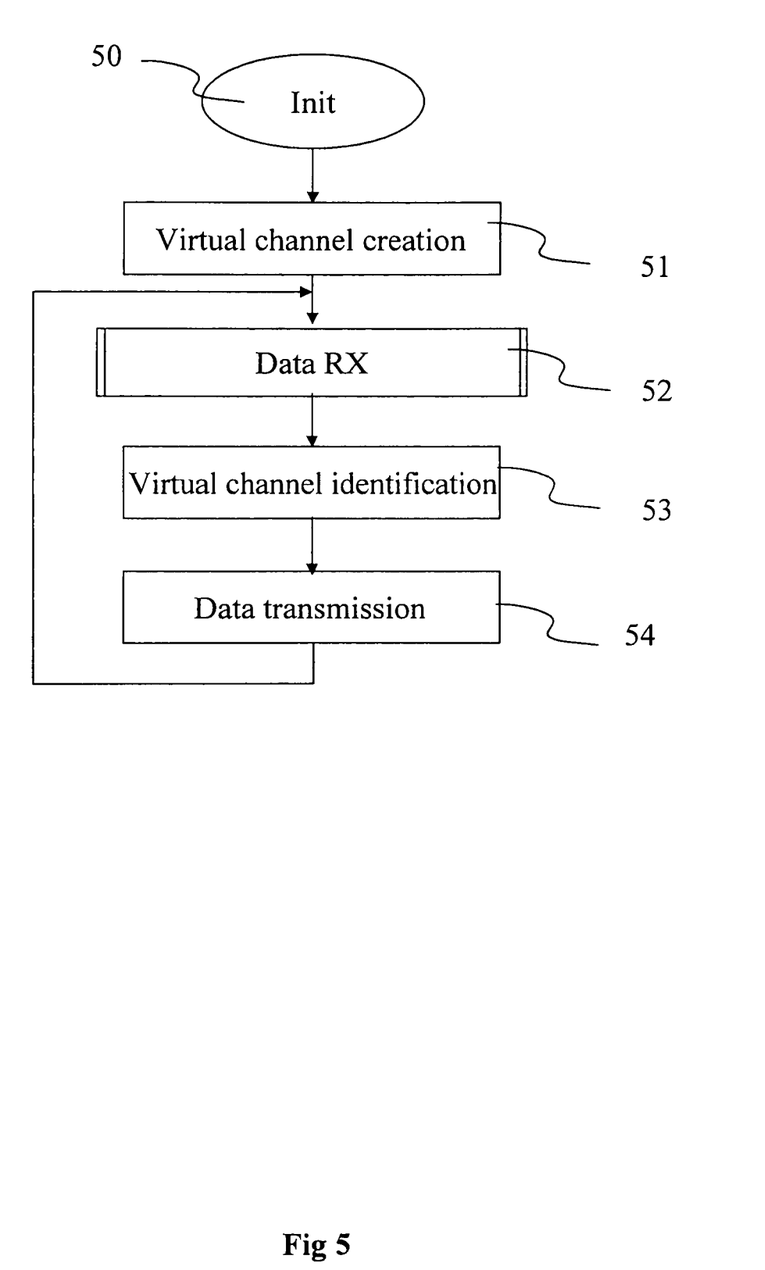
FIGS. 5 and 6 illustrate a data transmission method implemented respectively in the base station of FIG. 3 and in the remote station of FIG. 4.

FIG. 5 shows a communication method between the base station 20 and elements of the network 24 for the transmission and/or the reception of data (for example video) or of a communication signal (for example a clock signal). The method notably enables the at least one wireless virtual channel to be created, associated with the network 24 with configurable channel parameters and the data that transits via the base station 20 to the network 24 to be routed according to the virtual channel or channels created, each virtual channel enabling a point-to-point link between the base station 20 and a remote station. This creation of virtual channels and their use can ensure a continuity of the wired network 110 to the wireless network 24. In particular, the management of the bandwidth is made easier and a quality of service is guaranteed on each virtual channel (and therefore between each remote station and the base station, the virtual channel not being shared by two distinct remote stations) even when the transmission capacities (overall bandwidth) of the network 24 are less than that of the network 110. At any time, the base station knows the bitrate available on a virtual channel and therefore between itself and each remote station on the uplink and the downlink. There is only one path between a source of the network 24 and a recipient, this path corresponding to a succession of physical point-to-point links on the wire or virtual (or logical) links on the wireless link or links.

During a first step 50, the base station 20 initialises its different parameters and variables enabling the implementation of the communication method.

Then, during a step 51, the base station 20 identifies the different elements of the network 24 with which it can communicate during a discovery phase implemented according to any method (pre-recording, reception of dedicated messages emitted spontaneously by the nodes of the network 23 (for example on a dedicated channel) or in response to a request from the base station and creates the corresponding virtual channels. During the creation of the virtual channels, the base station 20 defines one or more parameters 433 for each virtual channel. The parameters 433 for each virtual channel comprise, for example, one or more elements of the following set:
a connection identifier or CID
the communication direction, uplink (corresponding to the direction from the network 24 to the base station 20),
downlink (corresponding to the direction from the base station 20 to network 24) or, according to one variant, bidirectional,
the list of the MAC and/or IP addresses of the nodes of the network 24 associated with the virtual channel,
the maximum authorised bitrate,
the presence or absence of an acknowledgement mechanism (or ACK) or automatic request (or ARQ) and the corresponding parameters,
the type of connection, unicast and/or multicast and/or broadcast, and
the type of scheduling.

The parameters advantageously have a default value and can be modified automatically (for example according to the type of application implemented by the nodes associated directly or via a relay station to the virtual channel, the number of nodes connected to a switch to which the virtual channel is associated, according to the total bandwidth available and the number of virtual channels) or via an operator, for example by means of one or more configuration menus present on a network management machine (present in the base station 20 or remote station). Such a menu can also enable access to more detailed submenus, to information on the virtual channels or the nodes connected, to communication statistics. Hence, a submenu having the parameters specific to a connection for information or modification can be displayed. These parameters are for example parameters of a classifier or ARQ (particularly an ARQ window size, sizes of data blocks, a time-out value) that can be finite or infinite, for the retransmission or reception of data, a time-out value that can also be finite or infinite, for the connection associated with a retransmission or reception of data, the obligation to deliver or not to deliver the data packets in a predefined order.

According to the invention, the wireless medium connecting the networks 110 and 24 and physically enabling communications between the base station 20 and the stations of the network 24 is converted into a set of virtual channels, each virtual channel authorising point-to-point communications between the station 20 and a remote station of the network 24, the remote station being able to serve as a relay to receive or transmit the data coming from or intended for a client node. There is, therefore, a topology comprising virtual channels suited to the guarantee of a quality of service.

Hence, according to the invention, the automatic or manual definition of the parameters can guarantee a determined quality of service. The continuity of the paths between a node of the network 24 and the network 110 is also ensured. Moreover, it is possible to create specific connections between the base station 20 and the remote stations 210, 220 and 230 with a configuration suitable to the quality of service required or desired (according to, for example, priorities, a maximum latency and a maximum jitter on a virtual channel). The nodes belonging to the network 24 can advantageously be managed as if they were connected to the base station 20 via a wired network. Advantageously, for each connection, the following is defined:
a connection identifier or CID,
a direction (for example upward or downward),
a point-to-point (or unicast), or point-to-multipoint (or multicast) connection type,
a maximum bitrate on the connection,
a scheduling type, of the type with a guaranteed bitrate that cannot be recovered by another connection (or unsollicited grant type),
a type of service (or TOS) present in the headers of IP packets or an IP address or a set of IP addresses IP, and one or more Automatic Request (or ARQ) parameters, for example, authorised or not, ARQ window size, data block size, time-out on the reception and retransmission of packets, time-out on a connection, a packet order conservation.

Next, during a step 52, the base station 20 waits for then receives from any source (for example, from a node of the network 110 or of the network 24) data intended for a recipient node of the network 24.

Then, during a step 53, the base station 20 identifies the virtual channel to use to transmit the data to the recipient node. The base station here implement a algorithm for classifying the data in the virtual channels created according to one or more classification fields (for example MAC or IP address, order of priority, VLAN tag) that enable a classifier to transmit the packets associated with these fields in the corresponding connection. This is used to ensure the quality of service (or QoS) requested during the configuration of the network.

Next, during a step 54, the base station 20 transmits the data on the virtual channel identified during the step 53. The step 52 is then reiterated.

According to a variant, the step 54 comprises a prior verification of available bitrate for a transmission of a flow on a virtual channel and:
  either of transmission authorisation of the flow if the bitrate available on the virtual channel is sufficient,
  or of transmission rejection of the flow if the bitrate available is insufficient for example, by sending a specific control message to a source node.

Advantageously, according to a particular embodiment of this variant, the base station updates the available bitrate in real time, for each virtual channel: if the available bitrate is sufficient, it reserves the bitrate of the corresponding flow on the virtual channel required and subtracts the bitrate used by this flow from the available bitrate.

According to the invention, the reception of data by the base station occurs in a similar manner to the transmission: a virtual channel is associated in the upward direction in the same manner as for the downward direction. After identification of a virtual channel, a classification takes place during the transmission at the remote station end to guarantee the desired or required quality of service and a transmission by the remote station intended for the base station is carried out on the virtual channel.

Figure 6:
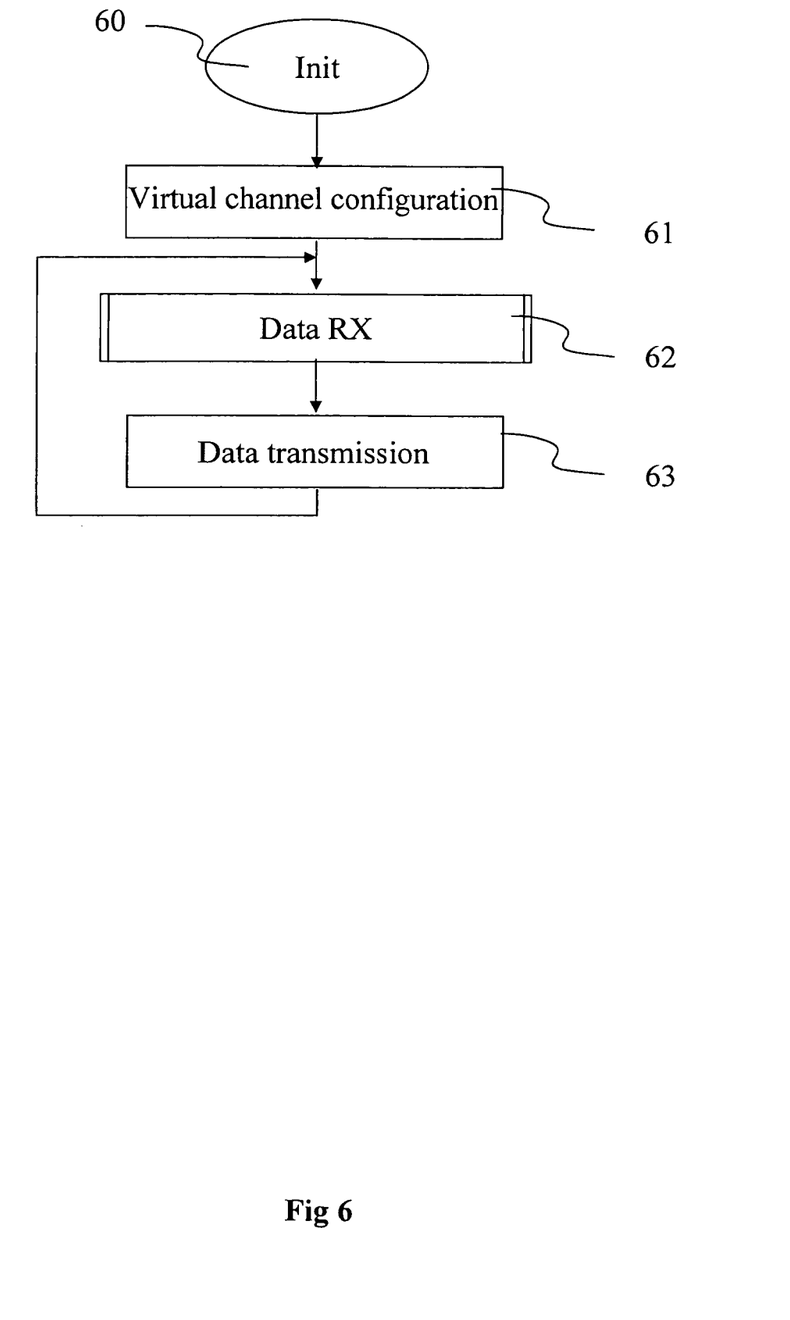

FIG. 6 shows a communication method between the remote station 4 and the base station 20 for the transmission and/or reception of data (for example video) or of a communication signal (for example a clock signal).

During a first step 60, the remote station 4 initialises its different parameters and variables enabling the implementation of the communication method.

Then, during a step 61, the remote station 4 identifies itself to the base station 20 (via for example, a dedicated signalling channel) and receives from the base station 20 the parameters of the virtual channel with which it is associated. When a remote station identifies itself to the base station according to any method, for example, compatible with the standard IEEE802.16, the remote station creates a first virtual signalling channel dedicated to this station. Next, several messages are exchanged in this first virtual channel to create the other virtual channel or channels between the base station and the remote station. The remote station 4 records these parameters in the register 433. These parameters correspond to the data stored in the register 333 of the base station and corresponding to the virtual channel attributed to the remote station 4. They are transmitted from the base station 20 to the remote station 4 according to any method (they are, for example, inserted in a signalling data packet used according to any protocol for setting up connections). The base station 20 can use, for this purpose, a signalling channel shared by all the remote stations and dedicated to the management of the network 24.

According to a variant, before the virtual channel configuration, a virtual channel identification is advantageously implemented: hence, before the creation of virtual channels specific to each remote station, data packets are transmitted via one or more channels by default and shared by several stations of the wireless network. When the virtual channels are created, these channels are used in priority, the associated connections with the other channels being eliminated.

According to another variant, a remote station configures an upward virtual channel with a similar configuration to that of a corresponding downward virtual channel.

Next, during a step 62, the remote station 4 waits for then receives from an application or a host H data intended for a recipient node of the network 110 or for a node of the network 24 not connected directly to the remote station 4: this is data that must transit by the base station 20 to reach the recipient.

Then, during a step 63, the remote station 4 transmits the data to the base station 20 to the recipient node via the virtual channel that has been attributed to it. Here too, the remote station implements a classification algorithm in order to comply with the data QoS constraints during the configuration. The step 62 is then reiterated.

Figure 7:
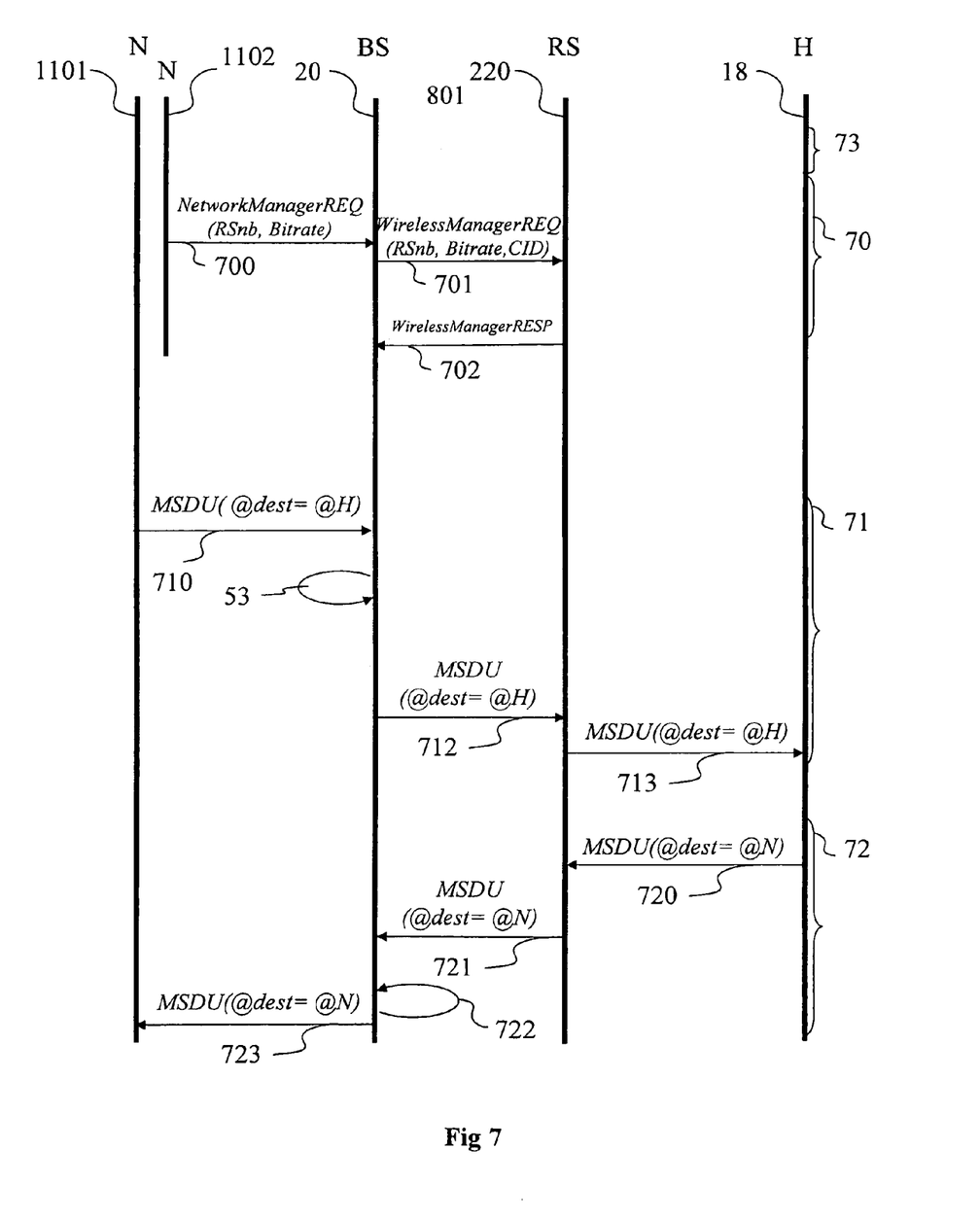
FIG. 7 shows an example of frame exchanges between different elements belonging to the networks of FIG. 2.

FIG. 7 illustrates an example of communication between any node 1100 of the network 110, a node 1101 of the network 110, enabling remote management of the base station 20, the base station 220 and the remote station 20 and a node 18 (these elements are shown by vertical lines; actions, events and/or successive transmissions are shown chronologically).

Four phases are shown in FIG. 7:
  a first topology discovery phase 73, then
  a virtual channel configuration phase 70,
  a transmission phase 71 of data from the node N 1101 to the node H 18, and
  a transmission phase 72 of data from the node H 18 to the node N 1101.

The phases 71 and 72 follow the configuration phase 70. They are independent and can notable be simultaneous, offset or separated.

During the phase 73, the base station implements a topology discovery of the elements of the wireless network according to any method (for example such as the methods known in the IEEE802.16 networks). The base station sends a request to discover the topology of the network 24 and each element of the network 24 (or by default at least the remote stations 210, 220 and 230) transmits to the base station its IP address and MAC address, and optionally parameters indicating the type of applications implemented by these elements or capable of transmitting data to the base station via these elements (case for example of remote stations that relay data from nodes attached via a wired link to these remote stations). In this manner, the base station becomes aware of the network and in particular the IP and MAC addresses of each element of the network and the parameters of the connections to create specific to one or more data applications (for example if a video flow must be transmitted from a source node of the network 110 to a destination node of the network 24 or vice versa, a connection is created between the base station and a remote station enabling this flow to pass). The created connection will be upward or downward according to the direction of the data flow.

The configuration phase 70 starts with a request 700 transmitted by the network controller 1102 intended for the station 20. This request (NetworkManagerREQ) 700 comprises the parameters of the identification of the remote station concerned (RSnb) and the bitrate to attribute to the virtual channel associated with this remote station (for example, station 220 with a bitrate of 10 Mpbs).

Next, the base station 20 stores these parameters then constructs a request (WirelessManagerREQ) 701 comprising the parameters of the request 700 and a connection identifier (CID). The station 20 then sends the request 701 to the remote station 220 corresponding to the station indicated in the request 700.

Next, the remote station 220 constructs a response (WirelessManagerResp) 702 acknowledging the parameters requested by the request 701. The station 220 then transmits the response 702 to the base station 20.

The phase 71 starts with the transmission of a data packet 710 of MAC level (MSDU) of the node 1101 to the base station 20, this packet comprising the recipient address (@H) corresponding to the node 18. The base station 20 determines the virtual channel corresponding to the recipient node 18 of the data packet during the step 53 described above.

The station 20 then transmits a message 712 of the data packet type of MAC level and comprising the recipient address (@H) over the virtual channel determined during the step 53.

The station 220 receives the message corresponding to the virtual channel that is associated with it, extracts the message from it, verifies whether or not it is intended for it. The message being intended for a node 18, the station 220 constructs a message 713 comprising the data and the address of the recipient node 18 that receives it and transmits the data to the corresponding application.

The phase 72 starts with the transmission of a data packet 720 of MAC level (MSDU) of the node 18 to the remote station 220, this packet comprising the recipient address (@N) corresponding to the node 1101. The remote station checks that this packet is not intended for it or is not intended for a node that is associated with it (for example a node connected to the station 220 via a wired link) and transmits the packet in the form of a message 721 over the virtual channel that is associated with it for the uplink to the station 20. According to a variant capable of simplifying the implementation in the station 220 and of accelerating the transmission of packets that must transit by the base station 20, the station 220 does not carry out any filtering on the addresses and transmits all the packets over the virtual channel.

The station 20 receives the message 711 and determines the recipient by carrying out a routing step 712:
if the message 721 is intended for a node of the network 24, the station 20 determines the virtual channel and transmits the message to the recipient, as described above according to the steps 53 and the sending of the message 712,
if the message 721 is intended for it, the base station 20 transmits it to the recipient application,
if the message 721 is intended for a node of the network 110 (case illustrated with respect to FIG. 7), the station 20 construct the corresponding message 723 and transmits over the network 110 to the recipient node; the recipient node 18 receives it and transmits the data to the corresponding application.

Naturally, the invention is not limited to the aforementioned embodiments.

In particular, the architecture of the primary and secondary networks can be different form the one illustrated with regard to FIG. 2. The number of elements and the topology of the primary and secondary networks can be of any type. The function and/or form of the elements of the primary and secondary networks (the functions of the electronic elements can notably be regrouped in a restricted number of components or, on the contrary, split into several components) and they can also have any form of arrangement.

The invention is not limited to an architecture as described with regard to FIG. 1 but relates to any architecture implementing a primary network and a secondary network connected between each other by a base station communicating directly or indirectly with the elements of the secondary network via a wireless medium (for example of the radio or optical type) with local (for example of a few meters or tens of meters) or remote (for example of a few kilometers according notably to a standard IEEE 802.16) coverage with one or more relay stations (or remote station), each remote station being connected at all times to the base station. According to a variant, the link between one or more relay stations and the attached nodes is a wireless link (local or remote link).

The invention is also compatible with an architecture comprising several base stations. Hence, the bandwidth of the network can be increased.

The invention can also be applied with different communication protocols than the ones described previously. Hence, the control data can be transmitted according to any protocol (for example with a contention access or in polling mode). The communication channels between the base station and the remote stations can also use the same frequency channels for the upward and downward direction (half duplex mode) or different frequency channels (full duplex mode).

The invention is advantageously applied to the transmission of video by mobile cameras (considered as nodes of the secondary network) to the nodes belonging to the primary network and carrying out the processing of the images and possibly their broadcasting. The invention is also advantageously implemented for other applications (for example, communication with mobile terminals, cameras, computer equipment, games consoles, these types of equipments belonging to a secondary network and being capable of receiving and/or transmitting data coming from or intended for a primary network.

According to some embodiments of the invention, a virtual channel is used in the downward direction and in the upward direction. According to the embodiment variants, the link between a base station and a remote station belonging to a secondary network can use a virtual channel for the upward direction and another virtual channel for the downward direction (which is particularly advantageous to guarantee a quality of service in both directions or to take into account the very different characteristics (for example useful bitrate) in the two directions).

According to the embodiment variants, the management of the virtual channels is offset in a management module of the virtual channels. This module is not necessarily contained in a base station. The base station and the remote stations manage the classification of the data packets that they send. However, the management module of the virtual channels advantageously takes into account the discovery of the topology and the creation of virtual channels. The management module of the virtual channels transmits messages to the base station or base stations as well as to the remote stations the parameters of these virtual channels.

The invention claimed is:

1. A communication method between a primary network and a secondary network, wherein the secondary network comprises a plurality of remote stations and has transmission capacities lower than the transmission capacities of the primary network, a base station enabling data transmissions between the primary and secondary networks, said method comprising:
creating at least one wireless virtual channel, associated with the secondary network with configurable channel parameters,
each virtual channel being associated to one single station of said plurality of remote stations and enabling a point-to-point link between the base station and said station of said plurality of remote stations, one single virtual channel being associated to one single station,
a single path being formed between a source of said primary network and said station, said single path comprising the single virtual channel associated to said station, and
routing the data that transits through said base station to be transmitted to said station of the secondary network according to the virtual channel created and associated to said station, and
verifying the bitrate available for a transmission of a flow to said station on the virtual channel associated with the station and for authorising transmission of the flow if the bitrate available on the virtual channel is sufficient or rejecting transmission of the flow if the bitrate available on the virtual channel is insufficient.

2. The method according to claim 1, further comprising:
identifying a data recipient node, and
transmitting data over a virtual channel associated with the recipient node.

3. The method according to claim 1, wherein at least one part of the remote stations is connected to a plurality of client nodes belonging to the secondary network, each client node being suitable to communicate with a node of the primary network via the connected remote station and the base station, the method further comprising routing data intended for a client node to a wireless virtual channel associated with a remote station associated with said client node.

4. The method according to claim 1, wherein the channel parameters belong to the group comprising:
bandwidth characteristics,
latency characteristics,
quality of service characteristics, and
classification criteria.

5. The method according to claim 1, further comprising removing point-to-multipoint links between each remote station of the secondary network and the other stations.

6. The method according to claim 1, further comprising transmitting a video flow on at least one virtual channel.

* * * * *